(12) United States Patent
Zhou et al.

(10) Patent No.: US 8,151,037 B1
(45) Date of Patent: Apr. 3, 2012

(54) INTERFACE FOR SOLID-STATE MEMORY

(75) Inventors: Wei Zhou, San Jose, CA (US); Chee Hoe Chu, San Jose, CA (US); Po-Chien Chang, Milpitas, CA (US)

(73) Assignee: Marvell International Ltd. (BM)

( * ) Notice: Subject to any disclaimer, the term of this patent is extended or adjusted under 35 U.S.C. 154(b) by 376 days.

(21) Appl. No.: 12/463,687

(22) Filed: May 11, 2009

Related U.S. Application Data

(60) Provisional application No. 61/056,630, filed on May 28, 2008.

(51) Int. Cl.
*G06F 12/00* (2006.01)
(52) U.S. Cl. ......... 711/103; 711/114; 711/111; 711/112
(58) Field of Classification Search .................. 711/103, 711/114, 111–112; 710/105, 74, 5, 314–316
See application file for complete search history.

(56) References Cited

U.S. PATENT DOCUMENTS

| | | | |
|---|---|---|---|
| 7,362,566 B1 | 4/2008 | Sivertsen | |
| 7,464,240 B2 | 12/2008 | Caulkins et al. | |
| 7,472,208 B2 | 12/2008 | Rothman et al. | |
| 7,574,542 B2* | 8/2009 | Burroughs et al. | 710/74 |
| 7,584,325 B2* | 9/2009 | Holland et al. | 711/114 |
| 2008/0253077 A1 | 10/2008 | Miyamoto et al. | |

* cited by examiner

*Primary Examiner* — David Lam

(57) ABSTRACT

Devices, systems, methods, and other embodiments associated with an interface for solid state memory are described. In one embodiment, an apparatus is implemented with two or more input ports for receiving two or more different streams of disk drive commands. The apparatus is further implemented with an interface configured to aggregate the two or more different streams of disk drive commands into at least one aggregated command. The interface is configured to translate the at least one aggregated command into at least one solid state memory command for accessing solid state memory. The apparatus comprises a memory port to communicate the at least one solid state memory command to be performed on the solid state memory.

20 Claims, 8 Drawing Sheets

INTERFACE FOR SOLID-STATE MEMORY

CROSS REFERENCE TO RELATED APPLICATIONS

This application claims the benefit of U.S. provisional application Ser. No. 61/056,630 filed on May 28, 2008, which is hereby wholly incorporated by reference.

BACKGROUND

A disk drive stores data to a magnetic disk and retrieves data from the magnetic disk. The data is encoded in a digital format to allow efficient manipulation of the data by devices that process data read from the disk drive. The disk drive does not directly store digital data. Instead, the disk drive stores analog signals that represent the digital data. Disk drives encode digital information as analog magnetic flux changes on spinning magnetic disks. The magnetic flux changes are read by a sensor in the disk drive and converted to an analog signal. The sensor is moved on a mechanical arm to a position from where the flux changes are read. The analog signal is decoded to recover the digital data. A circuit that reads the encoded data and reproduces the original digital data is referred to as a read channel.

Even though disk drives have been widely used for many years, a memory system using a disk drive has drawbacks. The disk drive executes operations in a serial manner because the mechanical arm with the sensor needs to be moved from one position to the next when data is accessed on different disk drive tracks. The disk drive also takes time to speed up from an idle state before memory can be accessed. A wobbly magnetic disk may not be reliably read. Temperature may also affect the reliability of the magnetic disk. In an ideal theoretical environment, each magnetic flux change of a magnetic disk represents a bit value of zero or one. In practice, the physical proximity of one recorded bit to the next adjacent bit tends to cause interference between the adjacent bits. This interference eventually leads to digital bit errors when the analog signal is converted to a digital signal. For these reasons a more reliable memory system may be desired.

SUMMARY

An example embodiment includes an apparatus implemented with two or more input ports for receiving two or more different streams of disk drive commands. The apparatus is further implemented with an interface configured to aggregate the two or more different streams of disk drive commands into at least one aggregated command. The interface is configured to translate the at least one aggregated command into at least one solid state memory command for accessing solid state memory. The apparatus comprises a memory port to communicate the at least one solid state memory command to be performed on the solid state memory.

Another example embodiment includes an apparatus implemented with a serial attached small computer system (SCSI) (SAS) interface, an input/output processor, switches, and a memory controller. The SCSI SAS interface is configured to receive a memory request. The input/output processor is coupled to the SAS interface. The input/output processor is configured to create a memory controller command from the memory request. The switches are connected to the input/output processor. A first switch is connected to the input/output processor with two or more channels. The memory controllers are connected to the first switch. The first memory controller is configured to execute the memory controller command to access a memory.

Another example embodiment includes a method. The method translates one or more aggregated memory commands into a solid state memory command. The one or more aggregated memory commands are comprised of memory commands from different streams of magnetic disk drive commands. The solid state memory command is sent to a memory controller. The solid state memory command is executed in the memory controller to perform the solid state memory command in a solid state memory.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
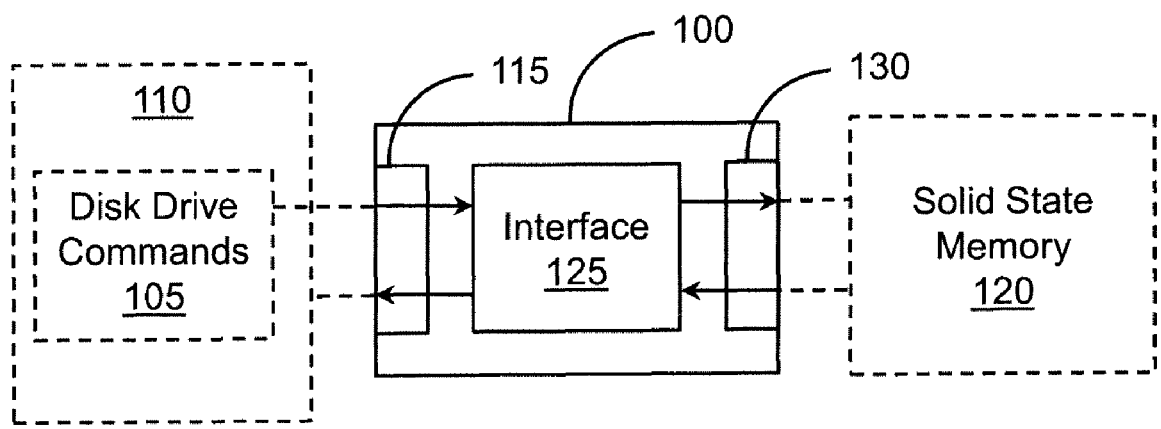
FIG. 1 illustrates one embodiment of an apparatus associated with a memory implemented with an interface.

Described herein are example systems, methods, and other embodiments associated with a memory system with an interface for a solid state memory. The interface and solid state memory are used to replace a magnetic disk drive in an electronic device without reconfiguring components that communicate with the magnetic disk drive. The interface includes a translation logic that receives magnetic disk drive commands that are directed to the magnetic disk drive. The translation logic is configured to translate the disk drive commands into solid state memory commands. The translation logic is configured to send the solid state memory commands to the solid state memory for processing. The solid state memory may be a semiconductor memory such as a flash memory device.

Another embodiment is associated with a memory system with a serial attached SCSI (SAS). A SCSI is a small computer system interface. The interface may be other high speed interfaces such as a serial ATA interface (SATA) or an ATA interface. An ATA interface is an advanced technology attachment (ATA) interface. One embodiment is implemented as a solid state memory device with an SAS interface. In some embodiments, the SAS interface conforms to the SAS interface standard published by the T10 committee. The T10 committee is a Technical Committee of the InterNational Committee on Information Technology Standards (INCITS). INCITS is accredited by, and operates under rules approved by, the American National Standards Institute (ANSI). Traditionally, disk drives have been interfaced using an SAS interface.

In one embodiment, a memory architecture is implemented that retains an SAS interface to interface memory storage devices. The architecture allows a disk drive to be replaced with solid state memory. Controller logic between the SAS interface and the solid state memory converts standardized SAS instructions into commands that the solid state memory understands. The SAS instruction conversion allows this memory architecture to operate with existing software and system hardware that has been developed to access memory in a disk drive. Disk drives access data in a serial manner because data is read from the disk through a sensor. In one embodiment, the controller logic may improve memory throughput by queuing received SAS instructions and issuing parallel commands to different solid state memory devices.

In another embodiment, a memory system is implemented with SAS, ATA, and/or SATA interfaces configured to receive memory requests. In one embodiment, the memory requests are implemented with predefined read/write commands. The memory system may be a solid state memory implemented with flash chips. An input/output (I/O) processor is coupled to the SAS, ATA, and/or SATA interfaces. The I/O processor creates a memory controller command from the memory requests. A switch is connected to the I/O processor with two or more channels. A memory controller is connected to the switch. The memory controller executes the memory controller command to access a memory. The memory may be a flash memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus 100 associated with accessing memory with SAS, ATA, and/or SATA interfaces. The apparatus 100 allows a disk drive to be replaced with solid state memory. Devices that issued disk drive commands 105 to the disk drive before the disk drive was replaced can still issue disk drive commands 105. The disk drive commands 105 are issued as if the disk drive was not replaced by the solid state memory. Disk drive commands 105 can still be issued because the apparatus 100 translates the disk drive commands 105 into solid state memory commands.

Even though FIG. 1 shows a single requesting device that is interfaced to the apparatus 100, in other embodiments, multiple electronic devices may send multiple different streams of disk drive commands 105 to the apparatus. The multiple different streams of disk drive commands may be received on multiple input ports 115. The multiple different streams of disk drive commands may be intended for different magnetic disk drives. The apparatus 100 will aggregate the multiple different streams of disk drive commands into a pool of commands awaiting execution. The apparatus 100 will translate the aggregated pool of commands into solid state memory commands to access solid state memory.

The apparatus 100 is configured to receive the disk drive commands 105 at an input port 115. The disk drive commands 105 are generated from a requesting device 110 that requests access to the disk drive. The disk drive commands 105 are not compatible to access the solid state memory. The apparatus 100 is implemented with an interface 125 configured to translate the disk drive commands 105 to solid state memory commands for accessing the solid state memory 120. In other embodiments, the interface 125 can be configured to translate the disk drive commands 105 to access other solid state memories such as flash memory. The apparatus 100 transmits the solid state memory commands through a memory port 130 to the solid state memory 120. The input port 115 and the memory port 130 can be any suitable port such as a universal serial bus (USB) port.

The conversion of the disk drive commands 105 to solid state commands is performed transparent to the requesting device 110. The conversion allows existing software and hardware in the requesting device 110 to operate as normal without requiring updating or reconfiguring in order to access the solid state memory.

Figure 2:
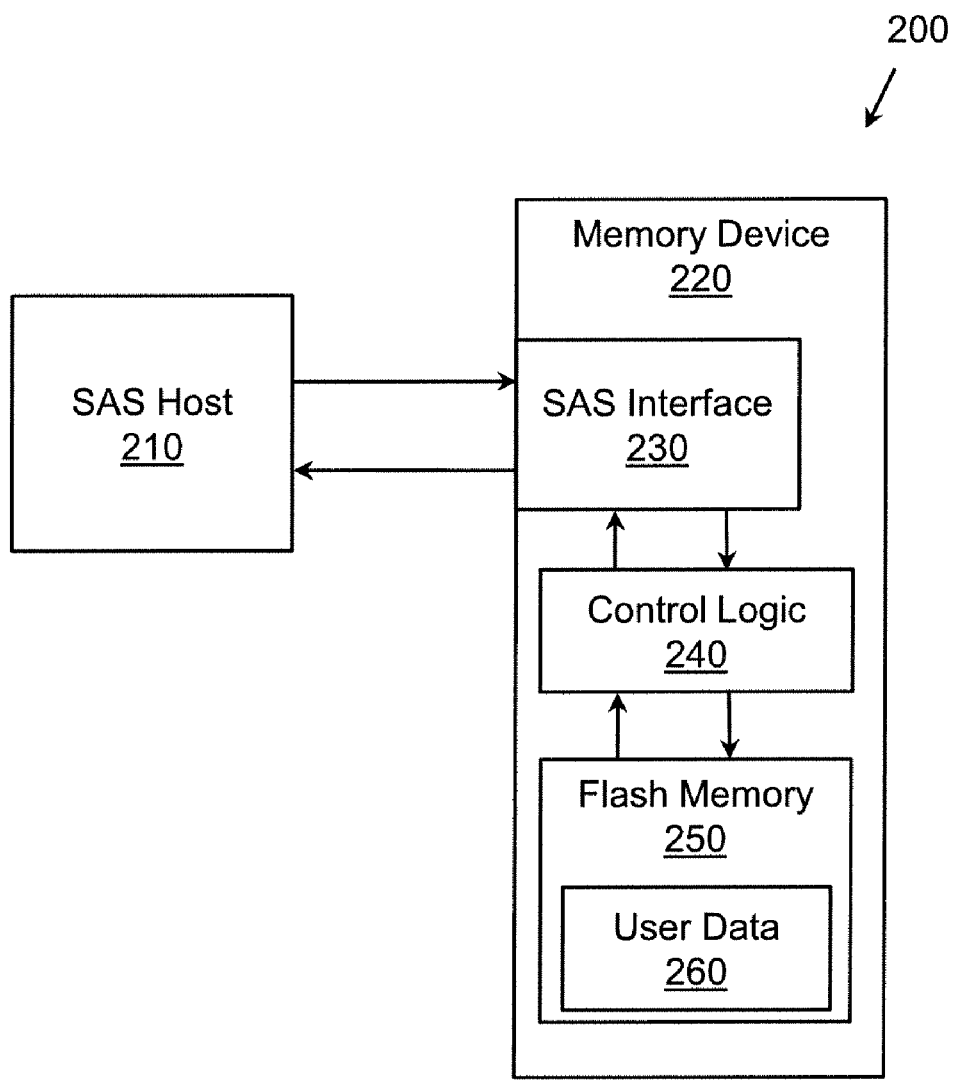
FIG. 2 illustrates one embodiment of a system associated with a memory implemented with an interface for solid state memory.

FIG. 2 illustrates one embodiment of a system 200 associated with accessing a flash memory with SAS, ATA, and/or SATA interfaces. The system 200 will be described with reference to an SAS interface 230. The system 200 is implemented with an SAS host 210, a memory device 220, the SAS interface 230, a control logic 240, and a flash memory 250. The original memory access requests are implemented as predefined read/write commands. The predefined commands may be high speed commands. For example, the commands may be SAS, ATA, and/or SATA commands as defined by INCITS. The memory access requests are received by the SAS interface 230 in the memory device 220 and transferred to the control logic 240.

The control logic 240 converts the memory access requests to a format that the flash memory 250 understands. In one embodiment, the flash memory 250 is implemented with banks of flash memory chips. The flash memory chips will correspond to different address ranges. The control logic 240 will receive a memory access request and decode the request to determine what addresses are being accessed. The control logic 240 will generate one or more flash commands for a memory access request. A flash command will instruct the flash memory 250 as to which flash memory bank to access and how to access the corresponding flash memory chip. In one embodiment, the flash command is sent to a control logic 240 associated with a flash memory chip in the flash memory 250. The control logic 240 may aggregate memory access requests from the SAS host 210 and generate flash commands based on the aggregated requests.

The flash memory 250 accesses user data 260 according to the flash command. User data 260 is returned by the memory device 220 to the SAS host 210 when a memory access request is a read request. The requested data may be stored in a memory in the control logic 240. The stored data may be periodically combined by the control logic 240 and returned to the SAS host 210 complying with the SAS standard. Implementing the system 200 in this architecture allows parallel access of the flash memory device 220 of FIG. 2.

Figure 3:
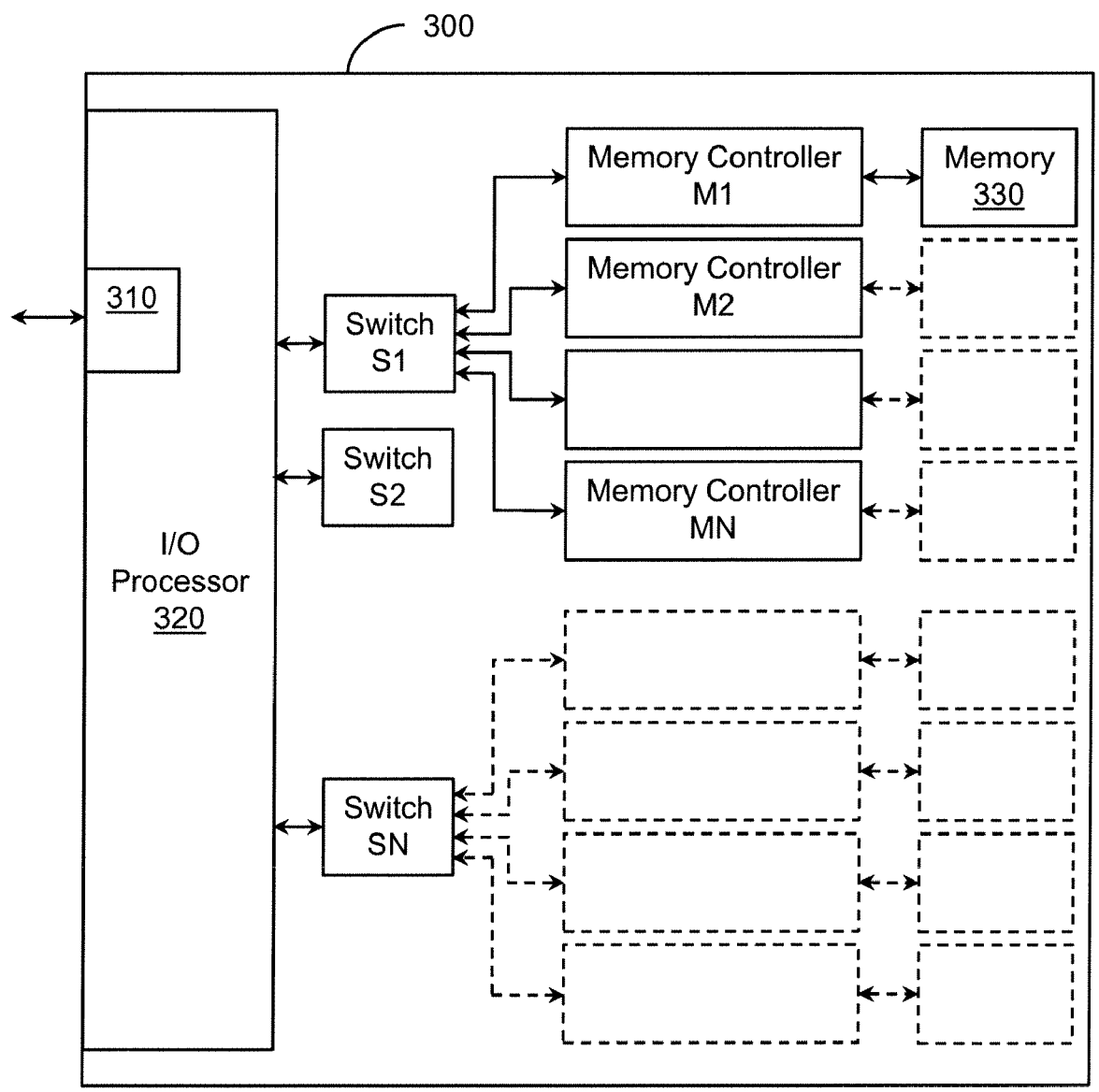
FIG. 3 illustrates one embodiment of an apparatus associated with a memory implemented with an interface for solid state memory.

FIG. 3 illustrates one embodiment of an apparatus 300 associated with a memory implemented with SAS, SATA, and/or ATA interfaces. The apparatus 300 will be described with reference to an SAS interface 310. The apparatus 300 may be implemented to access blocks of flash memory in flash memory chips. In one embodiment, the apparatus 300 implements a parallel flash memory controller in a chip. The chip is one or more electronic circuits fabricated on a piece of semiconductor material.

In one embodiment, the apparatus 300 is implemented with the SAS interface 310 coupled to an I/O processor 320. The SAS interface 310 receives a memory request. As discussed above, the SAS interface 310 and the memory request are compatible with the SAS standard as specified by the T10 committee of the INCITS. The SAS interface 310 may receive the memory request from an SAS host that is compliant with the SAS standard. The SAS interface may receive multiple SAS x4 connectors so that multiple SAS compliant commands may be received simultaneously. In one embodiment, the SAS interface 310 is compatible with legacy SAS disk drive interfaces. The SAS interface 310 operates in a target mode according to the SAS standard.

In one embodiment, the I/O processor 320 creates a memory controller command from the memory request. The memory request is a high level command that lower level memory controllers, discussed below, are unable to understand. The memory request is also a serial request that is SAS compatible. A serial request issues one instruction at a time. Serial instructions require earlier issued serial instructions to complete before a new serial instruction is issued. As discussed below, memory controller commands may be executed in parallel instead of serially as in a traditional disk drive. Firmware running on the I/O processor 320 may participate in creating the memory controller command.

The I/O processor 320 may build a command table and a data structure based, at least in part, on parameters in the memory request. The command table and a data structure facilitate generating and tracking memory controller commands. The command table and data structure may be based on multiple memory requests. The memory controller command is based, at least in part, on the command table and the data structure. For example, a high level memory request may be received that requests a string of data to be read. The string of data may span two flash memory blocks used to store data in the apparatus 300. The memory request is placed in the command table with two corresponding memory controller commands when the request spans two flash memory blocks. The two memory controller commands each access one of the two spanned flash memory blocks. The command table shows which commands are to be combined by the I/O processor 320 into a result message with the read data of both blocks. The result message is sent by the I/O processor 320 back to a device that sent the memory access command. In one example, the command table indicates which memory regions have outstanding memory access requests where the corresponding memory controller commands have not completed.

The data structure assists in determining which memory access requests require multiple memory controller commands. For example, the data structure will indicate flash memory block address ranges. The memory access request will generate two memory controller commands when data in the data structure indicates a memory access request spans a memory block boundary. People of ordinary skill in the art will appreciated the command table and data structure may be implemented in other ways and have other uses.

Switches S1-SN are connected to the I/O processor 320. Switch S1 may be connected to the I/O processor with two or more channels. For example, switch S1 may be connected to the I/O processor with four channels. Switches S1-SN may be peripheral component interconnected (PCI) express compatible. Switches S1-SN that are PCI express compatible may be suited to aggregate memory controller inputs. Those of ordinary skill in the art will appreciate that the switches S1-SN may be implemented with different switches and/or routing devices.

Memory controllers M1-MN are connected to switch S1. Memory controller M1 is connected to a memory 330. The memory controllers M1-MN execute the memory controller commands to access memory. In one embodiment, digital logic in the memory controllers M1-MN decodes and determines what type of memory access the memory controller commands request and what address locations are involved. The digital logic will drive flash memory bit lines and control signals to access memory. Firmware running on the memory controllers M1-MN may execute, at least in part, the memory controller command to access the memory 330.

In one embodiment, the memory controllers M1-MN may be flash memory controllers M1-MN that control flash memory. The memory controllers M1-MN may be implemented with an internal processor and a dynamic random access controller (DRAM) that is used to execute the memory controller command. In one embodiment, there are two of the switches S1-SN and four of the memory controllers M1-MN connected to the two switches so that the apparatus has eight memory controllers.

In one embodiment, the SAS interface 310 is configured to receive a second memory request. The I/O processor 320 is configured to create a second memory controller command from the second memory request. Memory controller M2 executes the second memory controller command to access a second memory. The first and second memory controller commands are executed, at least in part, in parallel.

Figure 4:
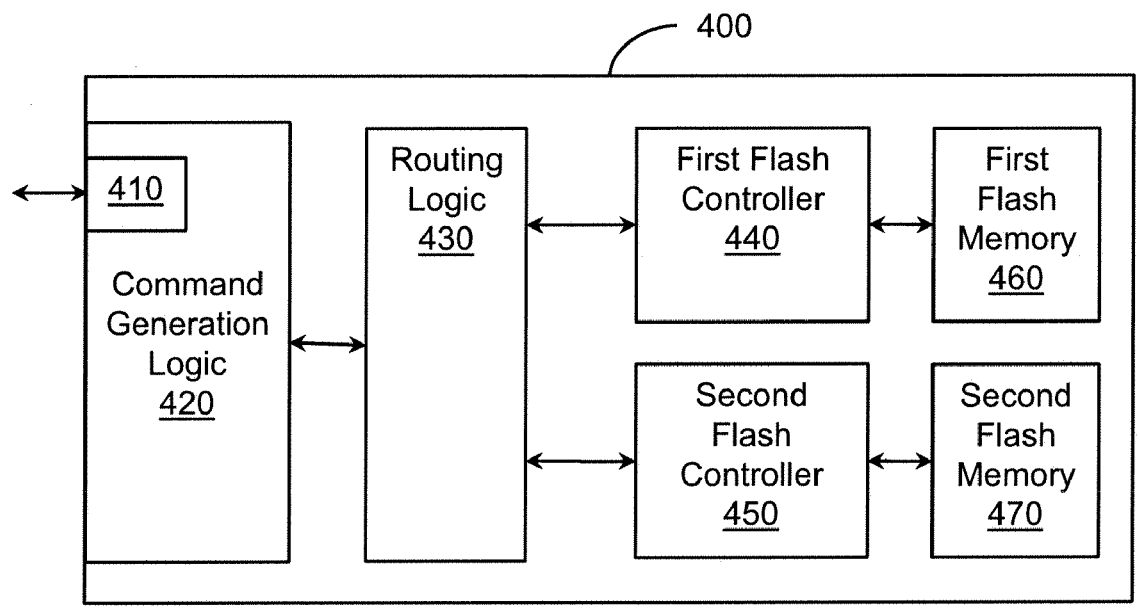
FIG. 4 illustrates another embodiment of an apparatus associated with a memory implemented with an interface for solid state memory.

FIG. 4 illustrates an embodiment of an apparatus 400 associated with a memory implemented with an SAS, ATA, and/or SATA interface. The apparatus 400 will be described with reference to an SAS interface 410. The apparatus 400 may be implemented to access blocks of flash memory in flash memory chips. In one embodiment, the apparatus 400 is implemented in a chip that contains solid state flash memory.

In one embodiment, the apparatus 400 is implemented with the SAS interface 410, a command generation logic 420, and a routing logic 430. The SAS interface 410 receives memory requests. The SAS interface 410 may be configured so that an SAS x4 connector may be connected to the apparatus 400. In one embodiment, the SAS interface 410 is compatible with legacy SAS disk drive interfaces. The SAS interface 410 and the apparatus 400 operates in a target mode according to the SAS standard.

The memory request received by the SAS interface may be a high level interface that solid state memory devices in the apparatus 400 cannot understand. The command generation logic 420 generates flash controller commands as a function of receiving parameters in the memory request. The flash controller commands can be understood and executed by memory controllers that access the solid state memory. The flash controller commands may include a first command and a second command. The command generation logic 420 may generate flash controller commands similar to the way the I/O processor 320 of FIG. 3 creates memory controller commands as discussed above.

In one embodiment, firmware running on the command generation logic 420 may participate in creating the memory controller command. The command generation logic 420 may build a command table and a data structure based, at least in part, on parameters in the memory request. The command table and the data structure are built and function as discussed above. The command table and the data structure may facilitate generating and tracking memory controller commands as discussed above.

In one embodiment, the routing logic 430 interfaces the command generation logic 420 to a first flash controller 440 and to a second flash controller 450. The routing logic 430 routes the first command to the flash controller 440 and routes the second command to the second flash controller 450. The routing logic 430 may be PCI express compatible. The routing logic 430 may be another suitable switch or routing device.

The first flash controller 440 processes the first command to access a first flash memory 460. The second flash controller 450 processes the second command to access a second flash memory 470. The first command and the second command are processed, at least in part, in parallel. The first and second commands are decoded to determine what type of memory access is contained in the commands and what memory locations to access. Digital logic in first flash controller 440 executes the first decoded command by controlling the first flash memory 460. Digital logic in second flash controller 450 executes the second decoded command by controlling the second flash memory 470. In one embodiment, firmware running on the first flash controller 440 and second flash controller 450 executes the first command and the second command. In one embodiment, first flash controller 440 and second flash controller 450 may be implemented, at least in part, with processors. The processors may execute firmware to execute the first command and the second command.

In one embodiment, the routing logic 430 interfaces the command generation logic 420 with more than one data channel. The routing logic 430 may interface the command generation logic 420 with an SAS 4x connection and the routing logic 430 may be a PCI express switch. The routing logic 430 interfaces the first flash controller 440 and the second flash controller 450 with one data channel. The routing logic 430 may interface the first flash controller 440 and the second flash controller 450 with an SAS 1x connection.

Figure 5:
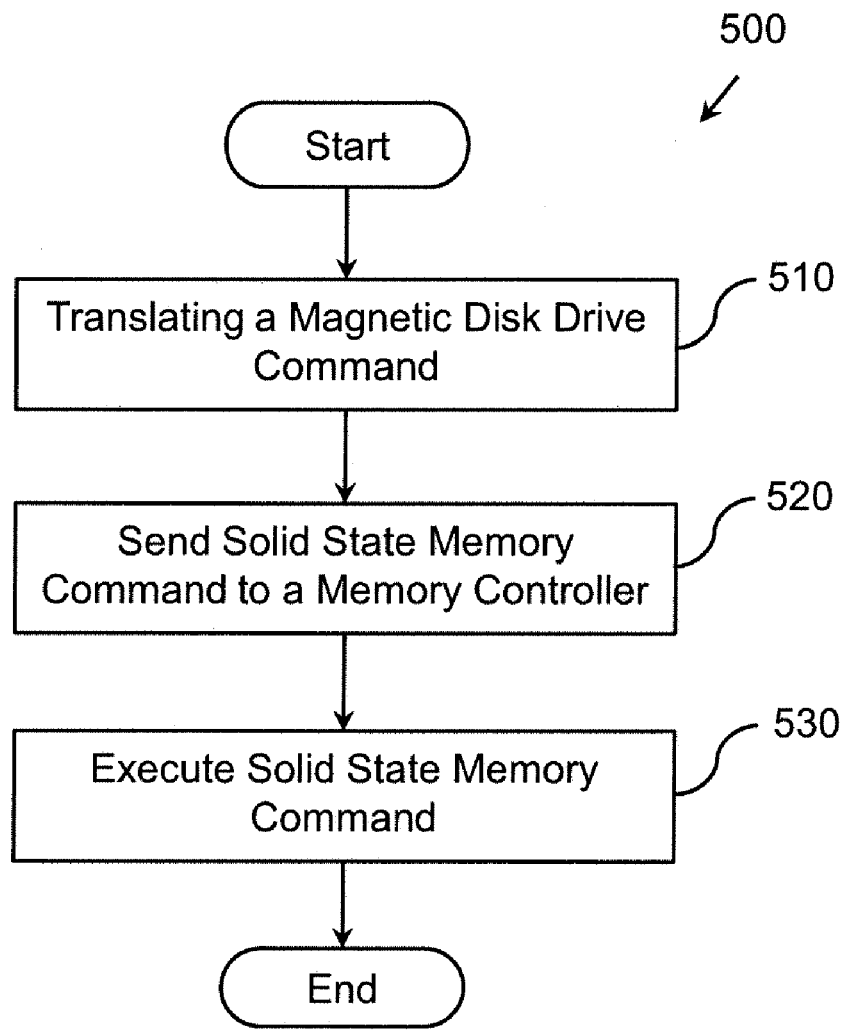
FIG. 5 illustrates one embodiment of a method associated with a memory implemented with an interface for solid state memory.

FIG. 5 illustrates an embodiment of a method 500 associated with translating disk drive commands. The method 500 improves memory storage systems by allowing disk drive commands to access solid state memory. Multiple streams of disk drive commands may be received by the method 500 from multiple electronic devices. The multiple streams of disk drives commands are aggregated. As discussed below, the aggregated disk drive commands are translated into solid state memory commands. The solid state memory may be a flash memory. The method 500 may be implemented in a chip.

In one embodiment, the method 500 translates, at 510, a magnetic disk drive command to a solid state memory command. The magnetic disk drive command may be a serial attached SCSI (SAS) host memory command, an advanced technology attachment (ATA) host memory command, and/or a serial ATA (SATA) host memory command. The method 500 will be described with reference to a SAS host memory command. The memory command may be compatible with SAS, ATA, and/or SATA standards as specified by INCITS.

The magnetic disk drive command may have originally been written to access a disk drive memory. The method 500 allows the memory command written for a disk drive to access flash memory as discussed below. The memory command is generated, at 510, by decoding the magnetic disk drive command to determine what types of memory accesses are requested and what address locations are to be accessed. Memory commands are generated for memory controllers based, at least in part, on the types of memory access and the memory locations to be accessed. In one embodiment, firmware running on a processor decodes the SAS host memory command and generates the memory command. The memory command may be generated by some of the actions of apparatus 300 and apparatus 400 discussed above.

The method 500 sends, at 520, the solid state memory command to a memory controller. In one embodiment, the memory command may be sent, at 520, to a switch that routes the memory command to a flash controller. The switch may be a PCI express compatible switch with SAS 4x input interfaces and SAS 1x output interfaces. The solid state memory command may be sent by other methods, over other buses, and through other devices.

The method 500 executes the solid state memory command, at 530, in the memory controller to access a flash memory. In one embodiment, a digital logic decodes and determines what type of memory access the memory command requests and what address locations are involved. The digital logic will drive flash memory bit lines and control signals to access the flash memory. The memory command may be executed by firmware running on a processor or the memory command may be executed in hardware or a combination of hardware and software.

Figure 6:
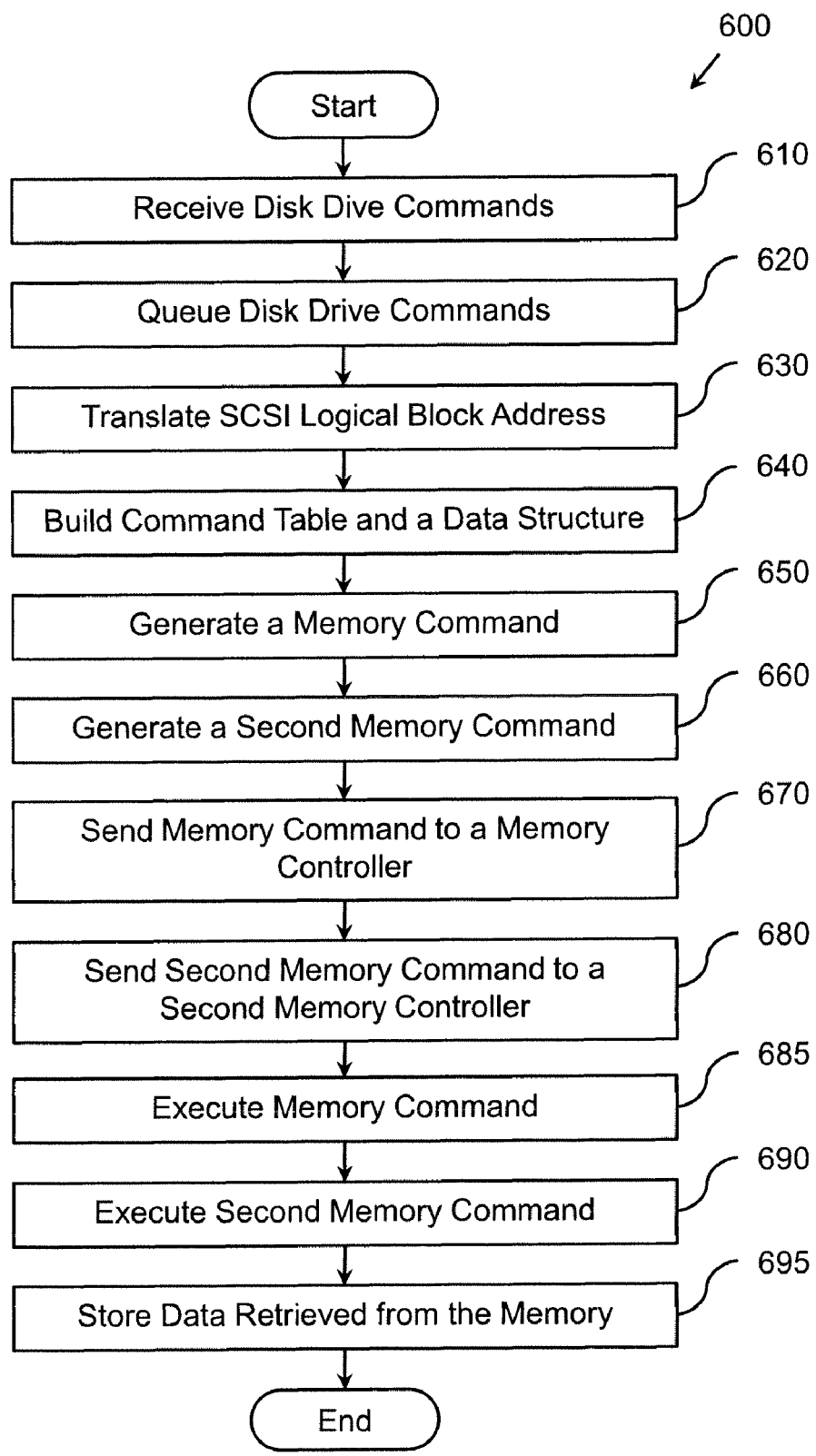
FIG. 6 illustrates another embodiment of a method associated with a memory implemented with an interface for solid state memory.

FIG. 6 illustrates an embodiment of a method 600 associated with a memory implemented with an SAS interface. The interface may also be an advanced technology attachment (ATA) interface command, and/or a serial ATA (SATA) interface. The method 600 improves memory storage systems by allowing SAS disk drive commands to access solid state flash memory. The method 600 may be implemented in a chip.

The method 600 begins, at 610, by receiving the SAS host memory command from an SAS host. The host may also be an advanced technology attachment (ATA) host, and/or a serial ATA (SATA) host. In one embodiment, the SAS host memory command may be compatible with the SAS standard as specified by the T10 committee. The SAS host memory command may be received through an SAS x4 interface. The SAS host memory command may be received through other interfaces.

Received SAS host memory commands may be queued at 620. The queuing may allow memory commands that are generated at 650 and 660 below to be executed in parallel. For example, generated memory commands that access different memory locations controlled by different memory controllers may be accessed, at least in part, in parallel. The queuing creates a pool of SAS host memory commands so that the chances of generating memory commands that execute, at least in part, in parallel are increased.

A small computer system interface (SCSI) logical block address is translated at 630. The SCSI logical block address is translated, at 630, into a block address. The block address may be mapped to a parallel flash drive. The mapping may be a function of parameters in the SAS host memory command. For example, a logical address in the SAS host memory command may determine a physical address of a flash memory to be access by a memory command. Memory commands are discussed below. The executing of the memory command, discussed below, is a function of the block address.

The method 600 builds a command table and a data structure at 640. The command table and the data structure are functions of parameters in the SAS host memory command. A memory command, discussed below, is generated based, at least in part, on the command table and the data structure. The command table and the data structure may facilitate the generation of the memory command as discussed above with reference to FIGS. 3 and 4.

At 650, the method 600 generates a memory command from the SAS host memory command. A second memory command is generated from the SAS host memory command at 660. In one embodiment, the memory command is generated by decoding the SAS host memory command to determine what types of memory accesses are requested and what address locations are to be accessed. Memory commands are generated for memory controllers based, at least in part, on the types of memory access and the memory locations to be accessed. In one embodiment, memory commands may be generated as a function of the queued SAS host memory commands. Memory commands that may be executed, at least partially, in parallel are generated from SAS host memory commands that have been queued.

The method 600 sends the memory command to a memory controller at 670. The memory command is executed by the memory controller as discussed below. The second memory command is sent to a second memory controller at 680. In one embodiment, the memory command and the second memory command are sent by routing the memory command and the second memory command through a PCI express compatible switch. The memory command and the second memory command may be sent in other ways.

The method 600 executes the memory command, at 685, in the memory controller to access a flash memory. The second memory command is executed, at 690, in a second memory controller to access a second memory. The memory command and the second memory are executed, at least in partially, in parallel. In one embodiment, a digital logic decodes and determines what type of memory access the memory command is requesting and what address locations are involved. The digital logic will drive flash memory bit lines and control signals to access the flash memory. The memory command may be executed by firmware running on a processor, by hardware, or a combination of hardware and software. A person of ordinary skill in the art will realized that that the memory command may be executed in other ways and by different circuits and logics.

The method 600 stores, at 695, data retrieved from the memory and the second memory. In one embodiment, the data is stored in a DDR memory before returning the data retrieved from the first memory to an SAS host. The retrieved data may be stored to allow multiple data blocks to be sent to the SAS host to be combined. The combined data blocks are sent to the SAS host with a single reply command containing the combined data.

Figure 7:
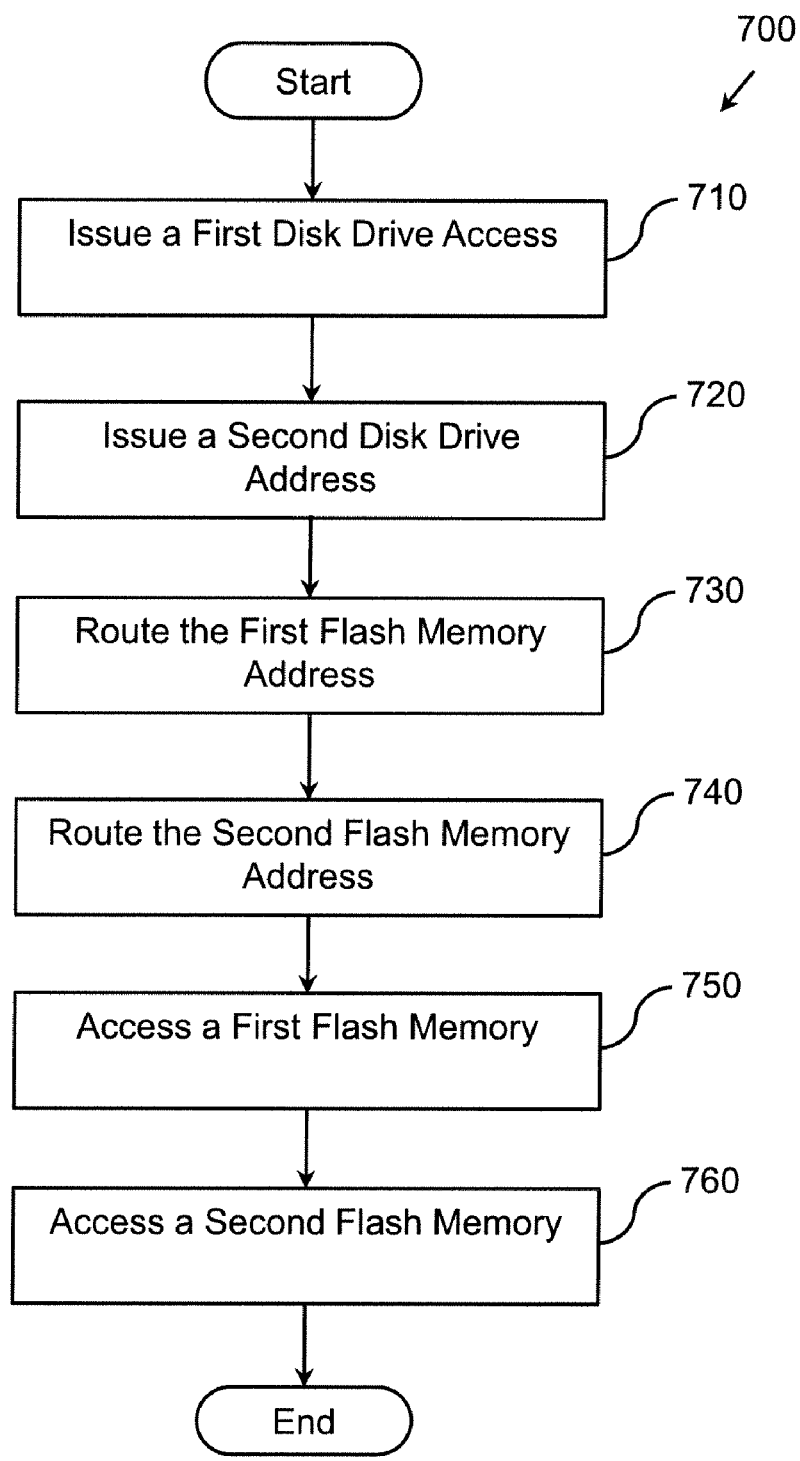
FIG. 7 illustrates another embodiment of a method associated with a memory implemented with an interface for solid state memory.

FIG. 7 illustrates an embodiment of a method 700 associated with a memory implemented with an SAS, ATA, and/or SATA interface. The method 700 improves memory storage systems by allowing SAS disk drive commands to access solid state flash memory. The method 700 may be implemented in a chip. The method 700 can be implemented by hardware, software, or a combination of hardware and software.

The method 700 begins by issuing a first memory access command at 710. A second memory access command is issued at 720. The first memory access and the second memory access are issued in response to receiving an SAS, an ATA, or an SATA host memory command.

The method 700 routes the first memory access command at 730. The method 700 routes the second memory access command at 740. The first memory access command and the second memory access command may be routed through switches that are PCI express compatible. The first memory access command may be routed to a first flash controller and the second memory access command may be routed to a second flash controller. The first memory access command and the second memory access command may be routed in other ways.

The method 700 accesses a first flash memory at 750. The method 700 accesses a second flash memory at 760. In one embodiment, the first flash memory is accessed according to the first memory access command. The second flash memory is accessed according to the second memory access command. The first flash memory and the second flash memory are accessed, at least in part, in parallel.

In one embodiment, a digital logic decodes and determines a first type of memory access corresponding to the first memory access command. The digital logic decodes and determines a second type of memory access corresponding to the second memory access command. The digital logic drives flash memory bit lines and control signals to access the first flash memory according to the first type of memory access. The digital logic drives flash memory bit lines and control signals to access the second flash memory according to the second type of memory access. The memory command may be executed, at least in part, by firmware running on a processor. A person of ordinary skill in the art will realize that there are other circuits that may be configured to access the first flash memory and the second flash memory.

It will be appreciated that in one embodiment, the methods herein may be implemented as computer executable instructions embodied and stored on a computer-readable medium. When executed by a machine (e.g., processor, device) the instructions cause the machine to perform the methods described herein and their equivalents. The methods can also be implemented with circuits or a combination of hardware and software.

Figure 8:
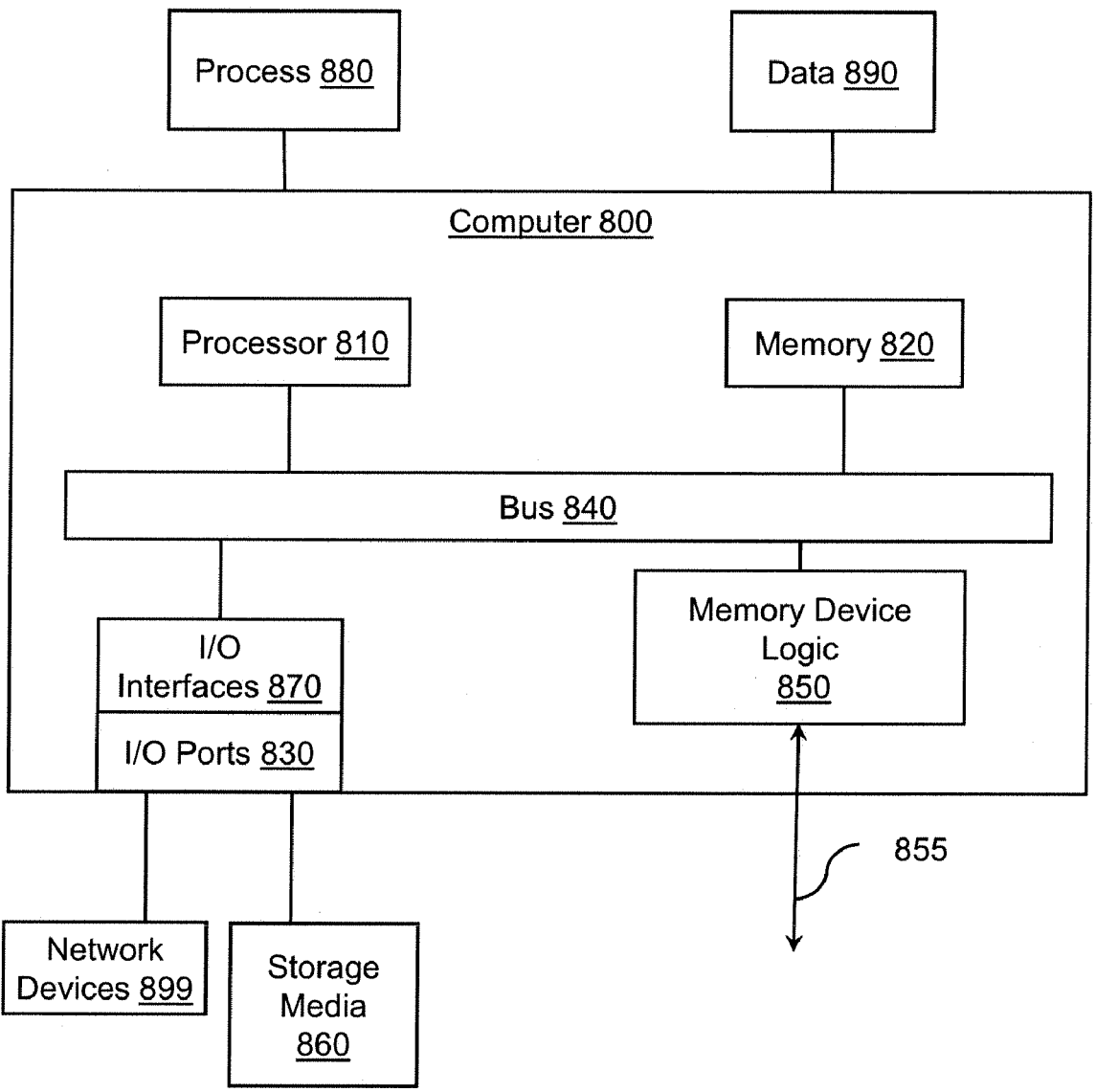
FIG. 8 illustrates an embodiment of a computing environment in which example systems and methods, and equivalents in which a memory implemented with an interface for solid state memory may be implemented.

FIG. 8 illustrates an example computer 800 in which example systems and methods described herein, and equivalents, are implemented. The example computer 800 comprises a processor 810, a memory 820, and input/output ports 830 operably connected by a bus 840. In one example, the computer 800 comprises memory device logic 850 to access memory. The memory device logic 850 implements an SAS, ATA, and/or SATA interface 855 as discussed above. The memory device logic 850 receives and sends SAS compatible instructions through the SAS, ATA, and/or SATA interface 855.

The memory device logic 850 provides means (e.g., hardware, stored software, firmware) for accessing data in a solid state memory or the memory 820. The memory device logic 850 can be implemented similar to the apparatus 300 and 400, and/or combinations of their features. The memory device logic 850 can include logic implemented, for example, as an ASIC or other type of circuit.

Generally describing an example configuration of the computer 800, the processor 810 may be a variety of various processors including dual microprocessor and other multi-processor architectures. A memory 820 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A storage media 860 may be operably connected to the computer 800 via, for example, through an input/output interface (e.g., card, device) 870 and the input/output port 830. The storage media 860 may be, for example, a magnetic drive, a solid state disk drive, a floppy disk drive, a tape drive, a Zip drive, a flash memory card, a memory stick, and so on. Furthermore, the storage media 860 may be a compact disk read-only memory (CD-ROM) drive, a compact disk recordable (CD-R) drive, a compact disk rewritable (CD-RW) drive, a digital video disk read-only memory (DVD ROM), and so on. The memory 820 can store a process 880 and/or a data 890, for example. The storage media 860 and/or the memory 820 can store an operating system that controls and allocates resources of the computer 800.

The bus 840 may be a single internal bus interconnect architecture and/or other bus or mesh architectures. While a single bus is illustrated, it is appreciated that the computer 800 may communicate with various devices, logics, and peripherals using other busses (e.g., peripheral component interconnect express (PCIE), 1394, universal serial bus (USB), Ethernet). The bus 840 can be types including, for example, a memory bus, a memory controller, a peripheral bus, an external bus, a crossbar switch, and/or a local bus.

The computer 800 may interact with input/output devices via the input/output (I/O) interfaces 870 including the memory device logic 850 and the input/output ports 830. Input/output devices may be, for example, a keyboard, a microphone, a pointing and selection device, cameras, video cards, displays, the storage media 860, the network devices 899, and so on. The input/output ports 830 may include, for example, serial ports, parallel ports, and USB ports.

The computer 800 can operate in a network environment and thus may be connected to the network devices 899 via the I/O interfaces 870, and/or the I/O ports 830. Through the network devices 899, the computer 800 may interact with a network. Through the network, the computer 800 may be logically connected to remote computers. Networks with which the computer 800 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   two or more input ports for receiving two or more different streams of disk drive commands;
   an interface configured to aggregate the two or more different streams of disk drive commands into at least one aggregated command, where the interface is configured to translate the at least one aggregated command into at least one solid state memory command for accessing solid state memory; and
   a memory port to communicate the at least one solid state memory command to be performed on the solid state memory.

2. The apparatus of claim 1, where the interface logic is configured to translate disk drive commands that are one or more of: serial attached SCSI (SAS) commands, advanced technology attachment (AT A) commands, and serial AT A (SAT A) commands.

3. The apparatus of claim 1, where one of the two or more input ports is compatible with one or more of: a serial attached SCSI (SAS) disk drive interface, an advanced technology attachment (ATA) disk drive interface, and a serial ATA (SAT A) disk drive interface, and where the solid state memory is a flash memory.

4. An apparatus, comprising:
   a serial attached small computer system (SCSI) (SAS) interface configured to receive a memory request;
   an input/output (I/O) processor coupled to the SAS interface, the I/O processor being configured to create a memory controller command from the memory request;
   switches connected to the I/O processor, where a first switch is connected to the I/O processor with two or more channels; and
   memory controllers connected to the first switch, where a first memory controller is configured to execute the memory controller command to access a memory.

5. The apparatus of claim 4, where the SAS interface is compatible with a magnetic SAS disk drive interface.

6. The apparatus of claim 4, where the SAS interface is configured to receive a second memory request, where the I/O processor is configured to create a second memory controller command from the second memory request, where a second memory controller is configured to execute the second memory controller command to access a second memory, and where the execution of the memory controller command and the execution of the second memory controller command occur at least partially in parallel.

7. The apparatus of claim 4, where the I/O processor is configured to build a command table and a data structure based, at least in part, on parameters in the memory request, and where the memory controller command is based, at least in part, on the command table and the data structure.

8. The apparatus of claim 4, where the SAS interface is configured to operate in a target mode, and where the SAS interface is configured to receive two SAS x4 connectors.

9. The apparatus of claim 4, where the I/O processor further comprises a double data rate (DDR) memory configured to store data retrieved from the memory by the first memory controller, and where the memory controllers are configured to control solid state memory.

10. The apparatus of claim 4, where the first memory controller further comprises an internal processor and a dynamic random access controller (DRAM) configured to execute the memory controller command.

11. The apparatus of claim 4, where the SAS interface is configured to receive the memory request from an SAS host, an advanced technology attachment (AT A) host, and/or a serial AT A (SAT A) host.

12. The apparatus of claim 4, where the first switch is connected to the I/O processor with four channels, and where the first switch is peripheral component Interconnected (PCI) express compatible.

13. A method, comprising:
translating one or more aggregated memory commands into a solid state memory command, where the aggregated memory commands are comprised of memory commands from different streams of magnetic disk drive commands;
sending the solid state memory command to a memory controller; and
executing the solid state memory command in the memory controller to perform the solid state memory command in a solid state memory.

14. The method of claim 13, further comprising:
translating a small computer system interface (SCSI) logical block address into a block address mapped to a parallel flash drive as a function of parameters in the magnetic disk drive command, where executing the solid state memory command accesses a memory location determined by the block address.

15. The method of claim 13, further comprising:
generating a second solid state memory command from another magnetic disk drive command;
sending the second solid state memory command to a second memory controller; and
executing the second solid state memory command in the second memory controller to access a second solid state memory, where the execution of the solid state memory command and the execution of the second solid state memory command occur, at least in part, in parallel.

16. The method of claim 13, further comprising:
building a command table and a data structure as a function of parameters in the magnetic disk drive command, where the solid state memory command is based, at least in part, on the command table and the data structure.

17. The method of claim 13, further comprising:
queuing magnetic disk drive commands, where generating the solid state memory command is a function of the queued magnetic disk drive commands; and
receiving the magnetic disk drive command through one or more of: a serial attached SCSI (SAS) interface, an advanced technology attachment (ATA) interface, and a serial ATA (SATA) interface.

18. The method of claim 13, further comprising:
receiving one or more of: serial attached SCSI (SAS) commands, advanced technology attachment (AT A) commands, and serial AT A (SATA) commands from an SAS host, ATA host, and/or SATA host;
aggregating received commands; and
storing data retrieved from the solid state memory in a double data rate (DDR) memory before returning the data retrieved from the solid state memory to the SAS host, AT A host, and/or SAT A host.

19. The method of claim 13, where sending the solid state memory command to a memory controller further comprises:
routing the solid state memory command through a peripheral component interconnected (PCI) express compatible switch.

20. The method of claim 13, where the solid state memory command is a first solid state memory access command, where the method further comprises:
issuing a second solid state memory access command in response to receiving a serial attached small computer system interface (SCSI) (SAS) host memory command, an advanced technology attachment (ATA) host memory command, and/or a serial ATA (SATA) host memory command, where the sending further comprises:
routing the first solid state memory access command and the second solid state memory access command over a peripheral component interconnected (PCI) express compatible bus, where executing the solid state memory command further comprises:
accessing a solid state memory according to the first solid state memory access command; and
accessing another solid state memory according to the second solid state memory access command.

* * * * *